(12) United States Patent
Joji

(10) Patent No.: US 11,067,587 B2
(45) Date of Patent: Jul. 20, 2021

(54) AUTOMATIC ANALYSIS DEVICE

(71) Applicant: Hitachi High-Technologies Corporation, Tokyo (JP)

(72) Inventor: Akira Joji, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 16/621,271

(22) PCT Filed: May 31, 2018

(86) PCT No.: PCT/JP2018/020904
§ 371 (c)(1),
(2) Date: Dec. 11, 2019

(87) PCT Pub. No.: WO2019/021625
PCT Pub. Date: Jan. 31, 2019

(65) Prior Publication Data
US 2020/0110104 A1 Apr. 9, 2020

(30) Foreign Application Priority Data

Jul. 25, 2017 (JP) .............................. JP2017-143435

(51) Int. Cl.
*G01N 35/00* (2006.01)
(52) U.S. Cl.
CPC ................ *G01N 35/00623* (2013.01); *G01N 35/00663* (2013.01); *G01N 35/00732* (2013.01);
(Continued)
(58) Field of Classification Search
None
See application file for complete search history.

(56) References Cited

U.S. PATENT DOCUMENTS

| | | | |
|---|---|---|---|
| 4,166,095 A | * | 8/1979 | Kling ................. G01N 35/0092 422/67 |
| 6,544,476 B1 | | 4/2003 | Mimura et al. |

(Continued)

FOREIGN PATENT DOCUMENTS

| | | |
|---|---|---|
| CN | 103257243 A | 8/2013 |
| JP | 02-306165 A | 12/1990 |

(Continued)

OTHER PUBLICATIONS

International Search Report of PCT/JP2018/020904 dated Aug. 21, 2018.

(Continued)

*Primary Examiner* — Neil N Turk
(74) *Attorney, Agent, or Firm* — Mattingly & Malur, PC

(57) ABSTRACT

To reduce the risk of mistaken operation and improve convenience in an automatic analysis device. Information about types of measurement inputted from an input device is combined in an examination mode creation screen image 301 on a display device of an automatic analysis device that performs analysis of specific types of measurement on a specimen container accommodating a specimen, the information about types of measurement including biochemistry examination items 303, immunology examination items 304, ISE examination items 304, blood clotting examination items 306, etc. This information is associated with an examination mode name 302, which comprises discretionary setting information, and is stored in a table of a storage unit. Information which is to be displayed on the display device and for which a change in settings is to be enabled is limited on the basis of the stored information about types of measurement associated with the examination mode name 302.

12 Claims, 10 Drawing Sheets

(52) U.S. Cl.
CPC ............... *G01N 2035/0091* (2013.01); *G01N 2035/00633* (2013.01); *G01N 2035/00673* (2013.01); *G01N 2035/00831* (2013.01); *G01N 2035/00841* (2013.01); *G01N 2035/00851* (2013.01); *G01N 2035/00891* (2013.01)

(56) References Cited

U.S. PATENT DOCUMENTS

| | | | | |
|---|---|---|---|---|
| 2008/0031777 | A1* | 2/2008 | Mashiko | G01N 35/00722 422/67 |
| 2008/0310999 | A1* | 12/2008 | Yagi | G01N 35/02 422/65 |
| 2009/0214385 | A1 | 8/2009 | Mori et al. | |
| 2012/0039748 | A1 | 2/2012 | Mimura et al. | |
| 2013/0009988 | A1* | 1/2013 | Tokunaga | G01N 35/00871 345/629 |
| 2015/0219556 | A1* | 8/2015 | Adachi | G01N 21/253 436/43 |

FOREIGN PATENT DOCUMENTS

| | | |
|---|---|---|
| JP | 03-041365 A | 2/1991 |
| JP | 06-130071 A | 5/1994 |
| JP | 2004-309249 A | 11/2004 |
| JP | 2006-276040 A | 10/2006 |
| JP | 2010-217057 A | 9/2010 |
| JP | 2013-178161 A | 9/2013 |

OTHER PUBLICATIONS

International Preliminary Report on Patentability issued in International Application No. PCT/JP2018/020904 dated Aug. 1, 2019.
Chinese Office Action issued in corresponding Chinese Application No. 201880047328.5 dated Jul. 15, 2020.
Extended European Search Report received in corresponding European Application No. 18838646.0 dated Mar. 29, 2021.

* cited by examiner

[FIG. 1]
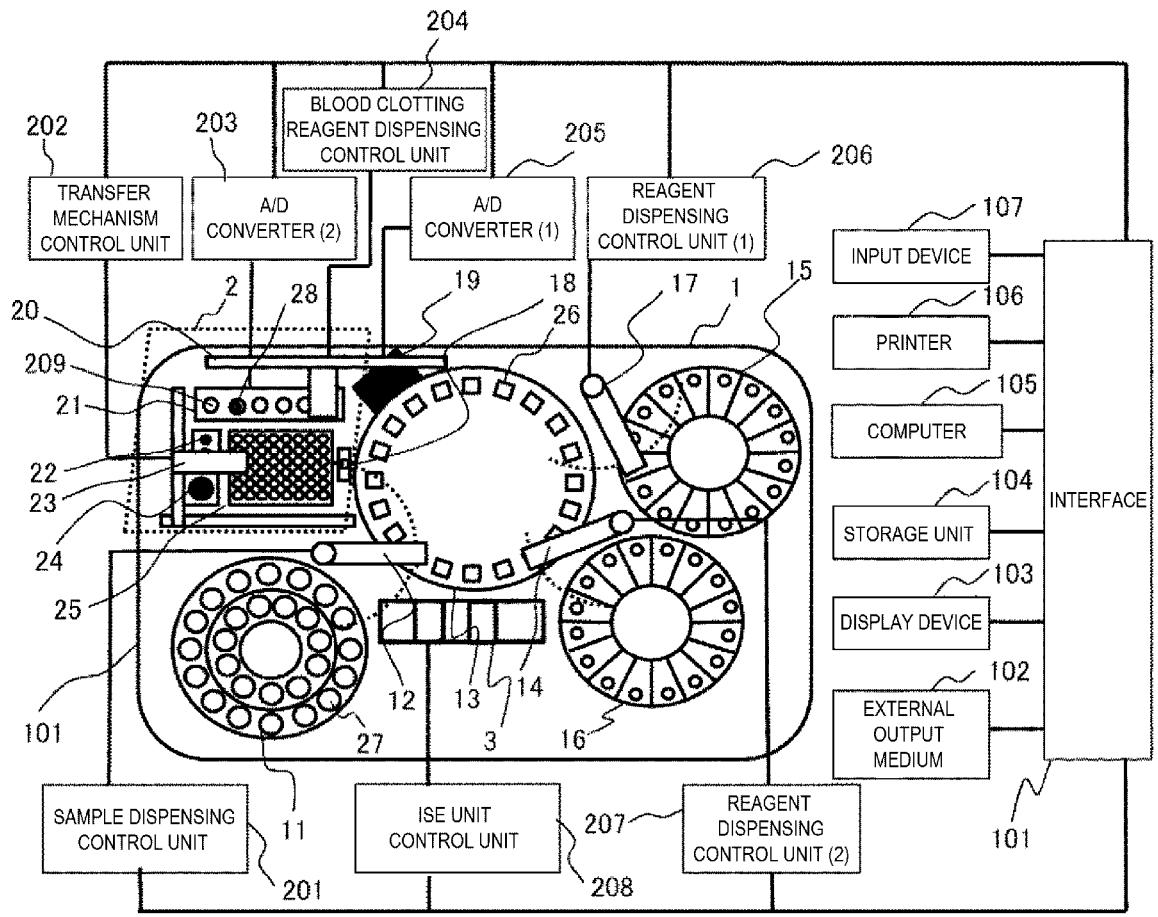
[FIG. 2]
| EXAMINATION MODE | BIOCHEMISTRY EXAMINATION ITEM | IMMUNOLOGY EXAMINATION ITEM | ISE EXAMINATION ITEM | BLOOD CLOTTING EXAMINATION ITEM |
|---|---|---|---|---|
| "BIOCHEMISTRY AND IMMUNOLOGY MEASUREMENT" | 3 | 3 | 0 | 1 |
| "SPECIFIC EXAMINATION" | 0 | 1 | 0 | 1 |
| "HUMAN DOCK MODE" | 1 | 1 | 1 | 1 |
| ... | ... | ... | ... | ... |

[FIG. 3]

EXAMINATION MODE CREATION

| EXAMINATION MODE: | BIOCHEMISTRY AND IMMUNOLOGY MEASUREMENT |
|---|---|
| BIOCHEMISTRY EXAMINATION ITEM | OPERABLE ▼ |
| IMMUNOLOGY EXAMINATION ITEM | OPERABLE ▼ |
| ISE EXAMINATION ITEM | INOPERABLE ▼ |
| BLOOD CLOTTING EXAMINATION ITEM | INOPERABLE ▼ |

REGISTER    CANCEL

[FIG. 4]

EXAMINATION MODE SELECTION

| USER ID | Operator_01 ▼ |
|---|---|
| EXAMINATION MODE | BIOCHEMISTRY AND IMMUNOLOGY MEASUREMENT ▼ |

APPLY    CANCEL

[FIG. 5A]

| ROUTINE OPERATION | REAGENT MANAGEMENT | CALIBRATION | ACCURACY MANAGEMENT | UTILITY | |
|---|---|---|---|---|---|
| ITEM SELECTION | MEASUREMENT RESULT | EXAMINATION MODE: | BIOCHEMISTRY AND IMMUNOLOGY MEASUREMENT | | |

SAMPLE IDENTIFICATION
◉ GENERAL SAMPLE
◎ EMERGENCY SAMPLE

SAMPLE TYPE: AAA
SAMPLE NUMBER: 1
POSITION: 1

ITEM

| Sheet1 | Sheet2 | Sheet3 | Sheet4 | Sheet5 | Sheet6 |
|---|---|---|---|---|---|
| TP_1 | ALB_1 | ALP_1 | TP_2 | ALB_2 | ALP_2 |
| PSA | CEA | CA19-9 | | | |
| Na | K | Cl | | | |
| PT | APTT | Fbg | D-Dimer | | |

[ REGISTER ] [ CANCEL ]

| POSITION | ITEM | CONDITION | NUMBER OF TESTS | REAGENT TYPE | CODE | LOT No. | EXPIRATION DATE | COMMENT |
|---|---|---|---|---|---|---|---|---|
| R1-1 | TP_1 | IN USE | 800 | R1 | 00001 | 00001 | 20XX/12 | |
| R1-2 | ALB_1 | IN USE | 700 | R1 | 00002 | 00002 | 20XX/12 | |
| R1-3 | ALP_1 | IN USE | 700 | R1 | 00003 | 00003 | 20XX/12 | |
| R1-4 | PSA | IN USE | 200 | R1 | 00004 | 00004 | 20XX/12 | |
| R1-5 | CEA | IN USE | 250 | R1 | 00005 | 00005 | 20XX/12 | |
| R1-6 | CA19-9 | IN USE | 300 | R1 | 00006 | 00006 | 20XX/12 | |
| R1-7 | PT | UNUSABLE | 400 | R1 | 00007 | 00007 | 20XX/12 | |
| R1-8 | APTT | UNUSABLE | 350 | R1 | 00008 | 00008 | 20XX/12 | |
| R1-9 | Fbg | UNUSABLE | 300 | R1 | 00009 | 00009 | 20XX/12 | |
| R1-10 | D-dimer | UNUSABLE | 300 | R1 | 00010 | 00010 | 20XX/12 | |
| R1-11 | TP_2 | IN USE | 400 | R1 | 00011 | 00011 | 20XX/12 | |
| R1-12 | ALB_2 | IN USE | 400 | R1 | 00012 | 00012 | 20XX/12 | |

Tabs: ROUTINE OPERATION | REAGENT MANAGEMENT | CALIBRATION | ACCURACY MANAGEMENT | UTILITY

SETTING | CONDITION | EXAMINATION MODE: BIOCHEMISTRY AND IMMUNOLOGY MEASUREMENT

Buttons: DETAIL | REGISTER | CANCEL | DELETE

| ROUTINE OPERATION | REAGENT MANAGEMENT | CALIBRATION | ACCURACY MANAGEMENT | UTILITY | |
|---|---|---|---|---|---|
| ITEM SELECTION | MEASUREMENT RESULT | EXAMINATION MODE: | BIOCHEMISTRY AND IMMUNOLOGY MEASUREMENT | | |

SAMPLE IDENTIFICATION | SAMPLE TYPE | SAMPLE NUMBER | POSITION
- ⦿ GENERAL SAMPLE
- ◎ EMERGENCY SAMPLE

SAMPLE TYPE: AAA
SAMPLE NUMBER: 1
POSITION: 1

ITEM

| Sheet1 | Sheet2 | Sheet3 | Sheet4 | Sheet5 | Sheet6 |
|---|---|---|---|---|---|
| TP_1 | ALB_1 | ALP_1 | TP_2 | ALB_2 | ALP_2 |
| PSA | CEA | CA19-9 | | | |
|  |  |  | | | |
|  |  |  | | | |

REGISTER | CANCEL

| POSITION | ITEM | CONDITION | NUMBER OF TESTS | REAGENT TYPE | CODE | LOT No. | EXPIRATION DATE | COMMENT |
|---|---|---|---|---|---|---|---|---|
| R1-1 | TP_1 | IN USE | 800 | R1 | 00001 | 00001 | 20XX/12 | |
| R1-2 | ALB_1 | IN USE | 700 | R1 | 00002 | 00002 | 20XX/12 | |
| R1-3 | ALP_1 | IN USE | 700 | R1 | 00003 | 00003 | 20XX/12 | |
| R1-4 | PSA | IN USE | 200 | R1 | 00004 | 00004 | 20XX/12 | |
| R1-5 | CEA | IN USE | 250 | R1 | 00005 | 00005 | 20XX/12 | |
| R1-6 | CA19-9 | IN USE | 300 | R1 | 00006 | 00006 | 20XX/12 | |
| | | | | | | | | |
| | | | | | | | | |
| | | | | | | | | |
| | | | | | | | | |
| R1-11 | TP_2 | IN USE | 400 | R1 | 00011 | 00011 | 20XX/12 | |
| R1-12 | ALB_2 | IN USE | 400 | R1 | 00012 | 00012 | 20XX/12 | |

Tabs: ROUTINE OPERATION | REAGENT MANAGEMENT | CALIBRATION | ACCURACY MANAGEMENT | UTILITY

SETTING | CONDITION | EXAMINATION MODE: BIOCHEMISTRY AND IMMUNOLOGY MEASUREMENT

Buttons: DETAIL | REGISTER | CANCEL | DELETE

| ROUTINE OPERATION | REAGENT MANAGEMENT | CALIBRATION | ACCURACY MANAGEMENT | UTILITY |
|---|---|---|---|---|

| ITEM SELECTION | MEASUREMENT RESULT | EXAMINATION MODE: | BIOCHEMISTRY AND IMMUNOLOGY MEASUREMENT |
|---|---|---|---|

SAMPLE IDENTIFICATION  SAMPLE TYPE  SAMPLE NUMBER  POSITION
● GENERAL SAMPLE
◎ EMERGENCY SAMPLE
AAA   1   1

: BIOCHEMISTRY EXAMINATION ITEM
: IMMUNOLOGY EXAMINATION ITEM

ITEM

| Sheet1 | Sheet2 | Sheet3 | Sheet4 | Sheet5 | Sheet6 |
|---|---|---|---|---|---|
| TP_1 | ALB_1 | ALP_1 | TP_2 | ALB_2 | ALP_2 |
| PSA | CEA | CA19-9 | | | |
| | | | | | |
| | | | | | |

[ REGISTER ]  [ CANCEL ]

| ROUTINE OPERATION | REAGENT MANAGEMENT | CALIBRATION | ACCURACY MANAGEMENT | UTILITY |

| SETTING | CONDITION |

: BIOCHEMISTRY EXAMINATION ITEM
: IMMUNOLOGY EXAMINATION ITEM

EXAMINATION MODE: BIOCHEMISTRY AND IMMUNOLOGY MEASUREMENT

| POSITION | ITEM | CONDITION | NUMBER OF TESTS | REAGENT TYPE | CODE | LOT No. | EXPIRATION DATE | COMMENT |
|---|---|---|---|---|---|---|---|---|
| R0-1 | TP_1 | IN USE | 800 | R1 | 00001 | 00001 | 20XX/12 | |
| R0-2 | ALB_1 | IN USE | 700 | R1 | 00002 | 00002 | 20XX/12 | |
| R0-3 | ALP_1 | IN USE | 700 | R1 | 00003 | 00003 | 20XX/12 | |
| R0-4 | PSA | IN USE | 200 | R1 | 00004 | 00004 | 20XX/12 | |
| R1-5 | CEA | IN USE | 250 | R1 | 00005 | 00005 | 20XX/12 | |
| R1-6 | CA19-9 | IN USE | 300 | R1 | 00006 | 00006 | 20XX/12 | |
| | | | | | | | | |
| | | | | | | | | |
| | | | | | | | | |
| | | | | | | | | |
| R0-11 | TP_2 | IN USE | 800 | R1 | 00011 | 00011 | 20XX/12 | |
| R0-12 | ALB_2 | IN USE | 400 | R1 | 00012 | 00012 | 20XX/12 | |

[ DETAIL ] [ REGISTER ] [ CANCEL ] [ DELETE ]

EXAMINATION MODE DETAIL SETTING SCREEN

EXAMINATION MODE: SPECIFIC EXAMINATION

| Sheet1 | Sheet2 | Sheet3 | Sheet4 | Sheet5 | Sheet6 |
|---|---|---|---|---|---|
| TP_1 | ALB_1 | ALP_1 | TP_2 | ALB_2 | ALP_2 |
| PSA | CEA | CA19-9 | | | |
| Na | K | Cl | | | |
| PT | APTT | Fbg | D-Dimer | | |

803

[ REGISTER ] [ CANCEL ]

| ROUTINE OPERATION | REAGENT MANAGEMENT | CALIBRATION | ACCURACY MANAGEMENT | UTILITY |
|---|---|---|---|---|

ITEM SELECTION | MEASUREMENT RESULT

EXAMINATION MODE: SPECIFIC EXAMINATION

SAMPLE IDENTIFICATION
◉ GENERAL SAMPLE
◉ EMERGENCY SAMPLE

SAMPLE TYPE: AAA
SAMPLE NUMBER: 1
POSITION: 1

ITEM

| Sheet1 | Sheet2 | Sheet3 | Sheet4 | Sheet5 | Sheet6 |
|---|---|---|---|---|---|
| TP_1 | ALB_1 | ALP_1 |  |  |  |
| PSA | CEA |  |  |  |  |
|  |  |  |  |  |  |
|  |  |  |  |  |  |

REGISTER    CANCEL 806    804    805

[FIG. 9]
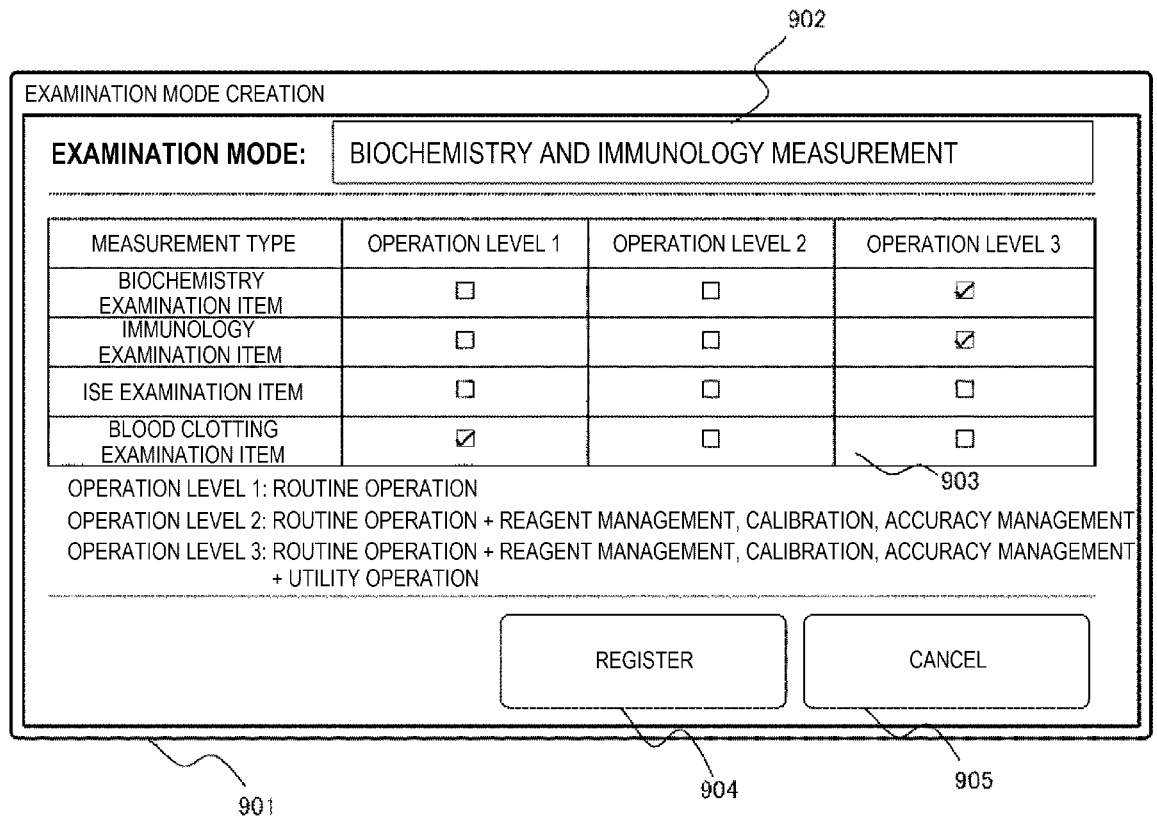
[FIG. 10]

AUTOMATIC ANALYSIS DEVICE

TECHNICAL FIELD

The present invention relates to a display technique for an automatic analysis device that automatically analyzes components such as blood.

BACKGROUND ART

As a device for analyzing target components contained in a biological sample such as blood, an automatic analysis device that measures an amount of transmitted light or scattered light with a single or a plurality of wavelengths obtained by irradiating, with light from a light source, a reaction solution in which a sample and a reagent are mixed is widely used.

Such automatic analysis devices include a biochemistry analysis device or an immunology analysis device that performs quantitative and qualitative analysis of the target components in the biological sample in fields of a biochemistry examination and an immunology examination, and a device for blood clotting analysis that measures clotting ability of a blood sample or the like.

With spread and development of the automatic analysis devices in recent years, a multi-module automatic analysis device in which a plurality of measurement modules are connected, each measurement module is capable of measuring an item with a single measurement type, and a composite automatic analysis device capable of measuring items with a plurality of measurement types with a single device are in circulation. These analysis devices include analysis parameters determined for each measurement type, or device information for each measurement unit. These pieces of information are stored in a storage unit in the device, but some information is displayed on a display device such as a display so as to provide the information to a user. Normally, such a multi-module automatic analysis device or composite automatic analysis device includes only one display device serving as an interface with the user. That is, information on a plurality of measurement types is displayed on one display device in a mixed manner. In this case, there is a problem in convenience for the user, such as mistaken operation on parameters that should not be operated or a longtime that is required to find specific information.

As a method for accessing data in the automatic analysis device, as in Patent Literature 1, there is a method of restricting the use of the analysis device by setting a permission level according to a logged-in user level, displaying a button corresponding to a function permitted to a specific operator in a color indicating that access is possible, and displaying a button corresponding to a function not permitted in a color indicating that access is not possible.

CITATION LIST

Patent Literature

PTL 1: JP-A-2006-276040

SUMMARY OF INVENTION

Technical Problem

In the composite automatic analysis device capable of measuring analysis items of a plurality of measurement types with the single device, or the multi-module automatic analysis device in which a plurality of measurement units are connected, each measurement unit is capable of measuring an analysis item of a single measurement type, device information on a unit for measuring each item, analysis parameters and analysis results specific to each item, or the like are included inside. These pieces of information are usually displayed on a common display device with information on all measurement types in a mixed manner. The composite automatic analysis device or the multi-module automatic analysis device can measure the analysis items of the plurality of measurement types, and are therefore used by users in various fields.

In this way, a lot of information is mixed in the composite automatic analysis device and the multi-module automatic analysis device, even though these pieces of information are displayed on the common display device, the pieces of information may be used by users in a plurality of specialized fields. As a result, there is a risk of mistaken operations such as changing information that should not be changed or performing operations that should not be performed, and there is a problem in terms of convenience. In a method of the related art literature, operation authority is given for each user level, but selection of information for each measurement type is not disclosed.

An object of the invention is to provide an automatic analysis device capable of solving the above problems, reducing a risk of misreading information, and improving convenience.

Solution to Problem

In order to achieve the above object, the invention provides an automatic analysis device capable of analyzing analysis items of a plurality of measurement types, the automatic analysis device including: a sample disk holding a sample container accommodating a sample; a sample dispensing mechanism configured to dispense the sample from the sample container; a reagent disk holding a reagent container accommodating a reagent; a reagent dispensing mechanism configured to dispense the reagent from the reagent container; a measurement unit configured to perform analysis of the measurement types; a control unit configured to control the measurement unit; an input device configured to input information on a measurement type of the measurement unit; a storage unit storing information associated with any setting information in combination with the information on the measurement type input from the input device; and a display device configured to display the information on the measurement types to be operable based on the associated information.

Advantageous Effect

The automatic analysis device of the invention can reduce a risk of misreading information and improve user convenience.

BRIEF DESCRIPTION OF DRAWINGS

FIG. 1 is a diagram showing a basic configuration of an automatic analysis device according to each embodiment.

FIG. 2 is a diagram showing an example of a table in which an examination mode is associated with each examination item according to a first embodiment.

FIG. 3 is a diagram showing an examination mode creation screen of an automatic analysis device according to the first embodiment.

FIG. 4 is a diagram showing an examination mode selection screen of the automatic analysis device according to the first embodiment.

FIG. 5A is a diagram showing an analysis item selection screen of the automatic analysis device according to the first embodiment.

FIG. 5B is a diagram showing a reagent management screen of the automatic analysis device according to the first embodiment.

FIG. 6A is a diagram showing an analysis item selection screen of an automatic analysis device according to a second embodiment.

FIG. 6B is a diagram showing a reagent management screen of the automatic analysis device according to the second embodiment.

FIG. 7A is a diagram showing an analysis item selection screen of an automatic analysis device according to a third embodiment.

FIG. 7B is a diagram showing a reagent management screen of the automatic analysis device according to the third embodiment.

FIG. 8A is a diagram showing an examination mode detail setting screen of an automatic analysis device according to a fourth embodiment.

FIG. 8B is a diagram showing an analysis item setting screen of the automatic analysis device according to the fourth embodiment.

FIG. 9 is a diagram showing an examination mode creation screen of an automatic analysis device according to a fifth embodiment.

FIG. 10 is a diagram showing an example of a table in which an examination mode is associated with examination detail items according to the fifth embodiment.

DESCRIPTION OF EMBODIMENTS

Hereinafter, embodiments of the invention will be described with reference to drawings. First, a basic configuration example of an automatic analysis device commonly used in each embodiment is described with reference to FIG. 1. Here, as one embodiment of the automatic analysis device, an example of a composite automatic analysis device including turntable-type biochemistry and immunology analysis units, an ion selective electrode (ISE) measurement unit 3 and a blood clotting time analysis unit will be described.

As shown in FIG. 1, a reaction disk 13, a sample disk 11, a first reagent disk 15, a second reagent disk 16, a blood clotting time analysis unit 2, and a photometer 19 are disposed on a housing of an automatic analysis device 1.

The reaction disk 13 is a disk-shaped unit which is rotatable in a clockwise direction and a counterclockwise direction, and a plurality of reaction containers 26 for biochemistry and immunology analysis can be disposed on a circumference thereof.

The sample disk 11 is a disk-shaped unit which is rotatable in the clockwise direction and the counterclockwise direction, and a plurality of sample containers 27 for accommodating samples such as a standard sample and a test sample or the like can be disposed on a circumference thereof.

The first reagent disk 15 and the second reagent disk 16 are disk-shaped units that are rotatable in the clockwise direction and the counterclockwise direction, and a plurality of reagent containers for accommodating a reagent containing a component that reacts with a component of each examination item contained in the sample can be disposed on a circumference thereof. Although not shown in the figure, the first reagent disk 15 and the second reagent disk 16 may include a cool keeping mechanism or the like such that the reagent in the provided reagent containers can be kept cool.

A sample dispensing probe 12 is disposed between the sample disk 11 and the reaction disk 13, such that with a rotation operation of the sample dispensing probe 12, a sample can be aspirated and dispensed from and to the sample containers 27 on the sample disk 11, the reaction containers 26 on the reaction disk 13, the ISE measurement unit 3, and a reaction container for blood clotting analysis 28 in a sample dispensing position 18 of the blood clotting time analysis unit 2.

Similarly, a first reagent dispensing probe 17 is disposed between the first reagent disk 15 and the reaction disk 13, and a second reagent dispensing probe 14 is disposed between the second reagent disk 16 and the reaction disk 13, such that with a rotation operation thereof, an aspiration operation and a dispensing operation such as dispensing can be performed between the reaction containers 26 on the reaction disk 13 and the reagent containers on the first reagent disk 15 and the second reagent disk 16.

The ISE measurement unit 3 is provided with mechanisms and equipment necessary for ISE analysis. An ISE unit 29 is controlled by an ISE unit control unit 208.

The blood clotting time analysis unit 2 mainly includes a blood clotting time detection unit 21, a blood clotting reagent dispensing probe 20, a disposable reaction container magazine 25, a sample dispensing position 18, a reaction container transfer mechanism 23, a reaction container disposal port 24, and an optical jig magazine 22.

Next, a control system and a signal processing system according to the automatic analysis device 1 will be briefly described. A computer 105 is connected to, via an interface 101, a sample dispensing control unit 201, a reagent dispensing control unit (1) 206, a reagent dispensing control unit (2) 207, a blood clotting reagent dispensing control unit 204, an A/D converter (1) 205, an A/D converter (2) 203, and a transfer mechanism control unit 202, and transmits a command signal to each control unit.

The sample dispensing control unit 201 controls a sample dispensing operation performed by the sample dispensing probe 12 based on a command received from the computer 105.

The reagent dispensing control unit (1) 206 and the reagent dispensing control unit (2) 207 control a reagent dispensing operation performed by the first reagent dispensing probe 17 and the second reagent dispensing probe 14 based on a command received from the computer 105.

The transfer mechanism control unit 202 controls, based on a command received from the computer 105, an operation of transferring a disposable reaction container for blood clotting analysis 28 between the reaction container magazine 25, the sample dispensing position 18, a reaction port 209 of the blood clotting time detection unit 21, and the reaction container disposal port 24, which is performed by the reaction container transfer mechanism 23.

The blood clotting reagent dispensing control unit 204 controls, based on a command received from the computer 105, an operation of dispensing a reagent for blood clotting to a reaction container for blood clotting analysis 28 accommodating the sample dispensed by the sample dispensing probe 12 and transferred to the reaction port 209, which is performed by the blood clotting reagent dispensing probe 20. Alternatively, a pretreatment liquid which is a mixed liquid of a sample and a first reagent for blood clotting analysis mixed in the reaction container 26 is dispensed to an empty reaction container for blood clotting analysis 28 by the blood clotting reagent dispensing probe 20. In this case, a second reagent for blood clotting analysis is then dispensed to the reaction container 28 accommodating the pretreatment liquid. Here, the reagents for blood clotting analysis are disposed on the first reagent disk 15 and the second reagent disk 16, and are once dispensed by the first reagent dispensing probe 17 and the second reagent dispensing probe 14 to a reaction container 26 on the reaction disk 13 as necessary for the blood clotting analysis.

A value obtained by measuring transmitted light or scattered light of reaction liquid in the reaction container 26 converted into a digital signal by the A/D converter (1) 205 and a value obtained by measuring transmitted light or scattered light of reaction liquid in a disposable reaction container for blood clotting analysis 28 converted into a digital signal by the A/D converter (2) 203, which are detected by the photometer 19, are taken into the computer 105.

The interface 101 is connected with a printer 106 for printing when outputting a measurement result as a report or the like, a storage unit 104 or an external output medium 102 which is a storage device, an input device 107 such as a keyboard for inputting an operation command or the like, and a display device 103 for displaying a screen. The display device 103 includes, for example, a liquid crystal display, a CRT display or the like.

Analyses of biochemistry items and immunology items by the automatic analysis device 1 are performed according to the following procedure. First, an operator requests an examination item for each sample by using the input device 107 such as a keyboard. In order to analyze the sample for the requested examination item, the sample dispensing probe 12 dispenses a predetermined amount of sample from a sample container 27 to a reaction container 26 for biochemistry and immunology analysis in accordance with analysis parameters.

The reaction container 26 to which the sample is dispensed is transferred by rotation of the reaction disk 13, and stops at a reagent receiving position. Pipette nozzles of the first reagent dispensing probe 17 and the second reagent dispensing probe 14 dispense a predetermined amount of reagent solution to the reaction container 26 in accordance with the analysis parameters of a corresponding examination item. An order of dispensing the sample and the reagent described above may be reversed, and the reagent may be dispensed before the sample.

Thereafter, the sample and the reagent are stirred by a stirring mechanism (not shown) and mixed. When the reaction container 26 crosses a light measuring position, the transmitted light or scattered light of the reaction liquid is measured by the photometer 19. The transmitted light or scattered light subjected to the light measuring is converted into numerical data proportional to an amount of light by the A/D converter (1) 205, and is taken into the computer 105 via the interface 101.

Using this converted and taken numerical value, concentration data is calculated based on a calibration curve measured in advance by an analysis method designated for each examination item. Component concentration data as an analysis result of each examination item is output to the printer 106 or a screen of the display device 103, further to the external output medium 102.

Before the measurement operation described above is executed, the operator sets various parameters necessary for analysis and registers the reagent and the sample via an operation screen of the display device 103. Further, the operator confirms an analysis result after the measurement by using the operation screen on the display device 103.

An analysis of an ISE measurement item by the ISE measurement unit 3 of the automatic analysis device 1 is mainly performed according to the following procedure. First, the operator requests an examination item for each sample by using the input device 107 such as the keyboard. In order to analyze the sample for the requested examination item, the sample dispensing probe 12 dispenses a predetermined amount of sample from the sample container 27 to the ISE measurement unit 3 in accordance with the analysis parameters.

The ISE measurement unit 3 into which the sample is dispensed performs analysis within the ISE measurement unit 3 for the requested examination item. The analysis result is converted into numerical data, and is taken into the computer 105 via the ISE unit control unit 208 and the interface 101.

Using this converted numerical value, the computer 105 calculates the concentration data based on the calibration curve measured in advance by the analysis method designated for each examination item. The component concentration data as the analysis result of each examination item is output to the printer 106, the screen of the display device 103 or the like.

Before the measurement operation described above is executed, the operator sets various parameters necessary for the analysis via the operation screen of the display device 103. Further, the operator confirms the analysis result after the measurement by using the operation screen on the display device 103.

An analysis of a blood clotting time item by the blood clotting time detection unit 21 of the automatic analysis device 1 is mainly performed according to the following procedure. First, the operator requests an examination item for each sample by using an information input device 107 such as the keyboard. In order to analyze the sample for the requested examination item, the reaction container transfer mechanism 23 transfers the disposable reaction container for blood clotting analysis 28 from the reaction container magazine 25 to the sample dispensing position 18. The sample dispensing probe 12 dispenses a predetermined amount of sample from the sample container 27 to the reaction container for blood clotting analysis 28 in accordance with the analysis parameters.

The reaction container for blood clotting analysis 28 to which the sample is dispensed is transferred to the reaction port 209 of the blood clotting time detection unit 21 by the reaction container transfer mechanism 23, and a temperature thereof is raised to a predetermined temperature. The first reagent dispensing probe 17 dispenses a predetermined amount of reagent solution to a reaction container 26 on the reaction disk 13 in accordance with the analysis parameters of the corresponding examination item. Since a thermostatic chamber (not shown) is provided in the reaction disk 13, the reagent solution dispensed into the reaction container 26 is warmed to 37° C.

Thereafter, a blood clotting dispensing mechanism aspirates the reagent dispensed into the reaction container 26, and in the blood clotting reagent dispensing probe 20, after the temperature is raised to a predetermined temperature by a temperature raising mechanism (not shown), the blood clotting dispensing mechanism dispenses the reagent into the reaction container for blood clotting analysis 28. From a time when the reagent is dispensed, light measuring is started to be performed on transmitted light or scattered light of light with which the reaction container for blood clotting analysis 28 is irradiated. The transmitted light or scattered light measured by the photometer 19 is converted into the numerical data proportional to the amount of light by the A/D converter (2) 203, and is taken into the computer 105 via the interface 101.

The converted numerical value is used to obtain a time required for a blood clotting reaction (hereinafter, simply referred to as blood clotting time). For example, for examination items such as activated partial thromboplastin time (ATPP), the blood clotting time thus determined is output as the analysis result. Here, for the examination items such as fibrinogen (Fbg) or the like, with respect to the obtained blood clotting time, further, based on the calibration curve measured in advance by the analysis method specified for each examination item, the component concentration data is obtained and outputted as the analysis result. The blood clotting time or the component concentration data as the analysis result of each examination item is output to the printer 106 or the screen of the display device 103.

Here, before the measurement operation described above is executed, the operator sets various parameters necessary for the analysis and registers the reagent and the sample via the operation screen of the display device 103. Further, the operator can confirm the analysis result after the measurement by using the operation screen on the display device 103.

A dispensing destination of the sample to be dispensed by the sample dispensing probe 12 may be the reaction container 26. In this case, after a reaction with the pretreatment liquid in the reaction container 26 in advance as described above, the blood clotting reagent dispensing probe 20 can dispense the sample into the reaction container for blood clotting analysis 28.

By a momentum generated when the reagent is dispensed by the blood clotting reagent dispensing probe 20 to the sample previously accommodated in the reaction container for blood clotting analysis 28, the reagent is mixed and stirred with the sample in the reaction container for blood clotting analysis 28, which is called stir by dispensing. An order of dispensing the sample and the reagent in the example may be reversed, and the reagent may be dispensed before the sample, in this case, the sample can be mixed with the reagent by a momentum generated when the sample is dispensed.

Here, in order to perform reliable stirring in the stir by dispensing, it is important to maintain a high positional accuracy with respect to the reaction container at a position of a tip of the blood clotting reagent dispensing probe 20, and a special attention is required for the position adjustment.

First Embodiment

The first embodiment is an embodiment of an automatic analysis device capable of analyzing analysis items of a plurality of measurement types, the automatic analysis device including: a sample disk holding a sample container accommodating a sample; a sample dispensing mechanism configured to dispense the sample from the sample container; a reagent disk holding a reagent container accommodating a reagent; a reagent dispensing mechanism configured to dispense the reagent from the reagent container; a measurement unit configured to perform analysis of the measurement types; a control unit configured to control the measurement unit; an input device configured to input information on a measurement type of the measurement unit; a storage unit storing information associated with setting information in combination with the information on the measurement type input from the input device; and a display device configured to display the information on the measurement types to be operable based on the associated information.

FIG. 2 is a diagram showing an example of a table stored in the storage unit 104 in which information on a plurality of measurement types is combined and associated with an examination mode that is setting information according to the embodiment. In the same figure, a table 210 is stored in a predetermined area of the storage unit 104 as one of examination mode databases. As shown in the same figure, in the table 210, corresponding to an examination mode 211 optionally set as "biochemistry and immunology measurement", "specific examination", and "human dock mode", operation levels of examination items 212 such as a biochemistry examination item, an immunology examination item, an ISE examination item, and a blood clotting examination item to be executed corresponding to each examination mode are stored, and the operation levels of each examination item 212 and the examination mode 211 are combined and stored in association. In the table 210, a numerical value 0 in the table indicates operation and display disabled, a numerical value 1 indicates an operation level 1, a numerical value 2 indicates an operation level 2, and a numerical value 3 indicates an operation level 3. Thus, the table used in the embodiment stores operation level information indicating an operation level for each measurement type as the information associated with the setting information. When these pieces of information are extracted from the table 210, the operation level of each examination item can be confirmed using the examination mode 211 as a key, and screen display and operation authority can be changed as will be described below.

FIG. 3 is an example of a screen in a case of permitting the operation authority and information display to the examination mode "biochemistry and immunology measurement" for information related to routine operations such as operations related to the biochemistry examination item and the immunology examination item in the automatic analysis device according to the embodiment. A combination of the measurement types shown in FIG. 3 is an example, and the invention is not limited to this.

In an examination mode creation screen 301, reference numeral 302 denotes a location where a created examination mode is to be input, and "biochemistry and immunology measurement" is input here. Reference numeral 303 denotes a setting location that sets whether or not information related to the biochemistry examination item is operable. Reference numeral 304 denotes a setting location that sets whether or not information related to the immunology examination item is operable. Reference numeral 305 denotes a setting location that sets whether or not information related to the ISE examination item is operable. Reference numeral 306 denotes a setting location that sets whether or not information related to the blood clotting examination item is operable. Reference numeral 307 denotes a register button for inputting the above settings into the table of the storage unit 104 as described in FIG. 2. Reference numeral 308 denotes a cancel button for closing the examination mode creation screen 301 without reflecting the above settings in the table in the storage unit 104. A user can perform registration or cancellation using the register button 307 or the cancel button 308.

FIG. 4 is an example of a selection screen with which an examination mode optionally set and registered by the user can be selected and registered in the automatic analysis device according to the embodiment. An examination mode selection screen 401 displays a selection location 402 of a user ID "Operator_01" to which the examination mode is applied, and a selection location 403 of an examination mode to be applied to the selected user ID. Here, a setting of the examination mode "biochemistry and immunology measurement" created in FIG. is applied. Thus, Operator_01 can operate only the information related to the biochemistry examination item and the immunology examination item, and cannot operate the information on the ISE item and the blood clotting examination item.

The selection screen 401 further displays an apply button 404 for storing contents set on the examination mode selection screen 401 in the table 210 of the storage unit 104 and applying to the automatic analysis device 1, and a cancel button 405 for closing the examination mode selection screen 401 without reflecting the setting contents in the table of the storage unit 104.

Thus, information on a plurality of measurement types is combined and associated with the examination mode which is setting information to be set optionally, and the setting information can be reflected on the operation screen of the examination mode of the display device. The information on measurement types input from the input device is combined, the information associated with the examination mode which is any setting information is stored in the table of the storage unit, and the display device displays information on the measurement types to be operable based on the associated information such that the associated information can be selected for each user.

Next, specific examples of an analysis item selection screen and a reagent management screen in the automatic analysis device according to the embodiment will be described with reference to FIGS. 5A and 5B. FIG. 5A shows an analysis item selection screen 501 in which the contents set in FIGS. 3 and 4 are reflected in a mask display, and FIG. 5B shows a reagent management screen 502 in which the contents set in FIGS. 3 and 4 are reflected in the mask display.

As described above, an examination mode is created by the examination mode creation screen 301. At this time, information on analysis item of which measurement type is to be operated and displayed is set by the analysis item selection screen 501. In FIG. 3, as the examination mode "biochemistry and immunology measurement", an examination mode is created in which the analysis of two measurement types including the biochemistry examination item and the immunology examination item can be operated. Thus, an operator ID to which the examination mode "biochemistry and immunology measurement" is applied can operate only the information related to the biochemistry examination item and the immunology examination item, and cannot operate the information of the ISE item and the blood clotting examination item.

An analysis item screen 501 of FIG. 5A displays detail examination items of all measurement types including the biochemistry examination item, the immunology examination item, the ISE item, the blood clotting examination item, the ISE item, and the blood clotting examination item, but the ISE item (Na, K, Cl) and the blood clotting examination item (PT, APTT, Fbg, D-Dimer) are displayed in mask (gray) and cannot be selected.

In the reagent management screen 502 of FIG. 5B, the reagent used for the blood clotting examination item is displayed in mask (gray), and cannot be selected. A condition of the reagent is "unusable" regardless of the number of remaining tests, which clearly indicates that the reagent is unusable in the set examination mode. That is, in a case of FIG. 5B, the information on measurement types input from the input device is combined, the information associated with any of the setting information is stored in the storage unit, and the display device displays the information on measurement types to be operable based on the associated information, and clearly indicates that unassociated information cannot be operated.

An effect of the automatic analysis device according to the first embodiment described above is described. According to the embodiment, based on an examination mode, information on a measurement type to be operated is selected and associated with the operator ID, so that only the information on the selected measurement type can be operated on the screen in which information on the plurality of measurement types is mixed. Information on the measurement type that is not selected can be displayed in mask (gray), so as to clearly indicate that the information cannot be operated. In the present embodiment, information that is not selected is displayed in mask (gray) to show that the information cannot be operated, but a method of clearly displaying that the information cannot be operated is not limited to the displaying in mask (gray display). For example, the information may be displayed lighter than a color of a display screen to indicate inactivity. According to the present embodiment, the information that can be operated and cannot be operated can be clearly confirmed from the operation screen of the display device, and a risk of a mistaken operation of the user can be reduced.

In the present embodiment, the analysis item selection screen and the reagent management screen are given as examples, but an application range of the examination mode is an entire screen in which information on the plurality of measurement type is mixed in the automatic analysis device, and is not limited to a specific screen.

According to the automatic analysis device of the present embodiment, information of the measurement type to be displayed and operated is set for each examination mode that is the setting information and the associated information is stored, and the device is controlled based on the associated information, so that only the operation that can be executed based on the information on measurement type of a stored examination mode and an analysis of a set measurement type can be executed, and therefore, operable information corresponding to a purpose and an application can be accurately selected.

That is, it is possible to select any information that can be operated from the input device and information to be displayed on the display device according to the examination mode that is setting information optionally set by associating and combining information on the measurement types by the user. Thus, it becomes possible to display only necessary information on the display device in the automatic analysis device capable of analyzing the analysis items of the plurality of measurement types, and a risk of misreading the information can be reduced. The risk of the mistaken operation of the information can also be reduced, and convenience for the user is improved.

Second Embodiment

The second embodiment is an embodiment of the automatic analysis device in which information associated with setting information is stored in the storage unit in combination with information on measurement types input from the input device, the display device can display the information on the measurement types to be operable based on the associated information, and unassociated information is not displayed. In the present embodiment, information on the plurality of measurement type can be combined and associated with a set examination mode, and the setting can be clearly indicated on the operation screen.

FIG. 6A shows an example of an analysis item selection screen 601 in which the contents set in FIGS. 3 and 4 are reflected as displayed and not displayed, and FIG. 6B shows an example of a reagent management screen 602 in which the contents set in FIGS. 3 and 4 are reflected as displayed and not displayed.

Thus, by settings in FIGS. 3 and 4 and reflecting the settings as displayed and not displayed, only the information related to the biochemistry examination item and the immunology examination item is displayed to Operator_01, and the information on the ISE item and the blood clotting examination item is not displayed.

That is, only the biochemistry examination item and the immunology examination item which are selected in FIG. 3 are displayed in the analysis item selection screen 601 in FIG. 6A, and the ISE item (Na, K, and Cl) and the blood clotting examination item (PT, APTT, Fbg and D-Dimer) are not displayed. In the reagent management screen 602 of FIG. 6B, the reagent used for the blood clotting examination item is not displayed. The fact that the information on other measurement type is stored but not displayed since the information is not set to the examination mode is clarified by color coding or the like in addition to not being displayed, so that it is clarified that the analysis item or the reagent cannot be registered in a location not being displayed.

According to the embodiment, with the examination mode, only information on a selected measurement type can be displayed on the operation screen, and information related to unselected measurement type cannot be displayed. Thereby, information which can be operated by the user can be clarified as compared with displaying in mask (gray). Since unnecessary information is not displayed, the risk of the mistaken operation by the user can be reduced, and readability of the operation screen is improved.

Third Embodiment

The third embodiment is an embodiment of the automatic analysis device in which information associated with setting information is stored in the storage unit in combination with information on measurement types input from the input device, and the display device can display the information on measurement types by changing a color for each measurement type based on the associated information, so that the information is operable.

In the embodiment, the information on a plurality of measurement types can be combined and associated with a set examination mode, and the setting contents can be distinguished by color and reflected on the operation screen.

FIG. 7A shows an analysis item selection screen 701 in which the contents set in FIGS. 3 and 4 are distinguished by color, and FIG. 7B shows a reagent management screen 702 in which the contents set in FIGS. 3 and 4 are distinguished by color. For convenience of illustration, different colors are distinguished by shaded types.

The analysis item selection screen 701 in FIG. 7A only displays the biochemistry examination item and the immunology examination item which are selected from analysis item screen at FIG. 3. The biochemistry examination item and the immunology examination item are displayed in different colors, and it is possible to determine a measurement type of the registered examination item. Similarly, the reagent management screen 702 in FIG. 7B has a different color for each measurement type, and it is possible to determine a reagent is a reagent for which measurement type item.

According to the embodiment, with the examination mode, by displaying information on the selected measurement type by dividing the color for each measurement type, it becomes easy to determine which information is related to which measurement type. It becomes easy to determine the information related to the measurement type, the risk of the mistaken operation by the user can be reduced, and in addition to improving the readability, the information for each measurement type can be easily determined.

Fourth Embodiment

The embodiment is an embodiment of the automatic analysis device in which information associated with setting information is stored in the storage unit in combination with information on the measurement type and the analysis item input from the input device, and the display device can display information on the analysis item based on the associated information, so that the information is operable.

In the present embodiment, information on a plurality of measurement type and the information on the analysis item can be combined and associated with a set examination mode, and only information on the analysis item further required in the information on a selected specific measurement type can be selected and displayed.

FIG. 8A shows an examination mode detail setting screen 801 that sets an analysis item that can be operated and displayed in an examination mode. An examination mode setting column 802 of the examination mode detail setting screen 801 is a location in which an examination mode is input. An analysis item selection location 803 is a location in which an analysis item whose information is to be displayed and operated in the examination mode is selected. The analysis item of the analysis item selection location 803 displayed in mask (gray) indicates an item that is not selected. A register button 804 is a button for storing the above setting contents in the storage unit 104. A cancel button 805 is a button for closing the examination mode detail setting screen 801 without storing the settings into the storage unit 104. FIG. 8B shows an analysis item selection screen 806 that reflects the settings of the examination mode detail setting screen 801.

In the examination mode detail setting screen 801 in FIG. 8A, the analysis items to be operated and displayed in the examination mode are set. In the examination mode detail setting screen 801, an examination mode "specific examination" that can display and operate only "TP_1", "ALB_1", and "ALP_1" among the biochemistry examination item and "PSA" and "CEA" among the immunology examination item is created. In the analysis item selection screen 806 in FIG. 8B, among the biochemistry examination item and the immunology examination item which are selected in FIG. 3, only the item set in the examination mode detail setting screen 801 is displayed. Thus, only information on items to be used by the user can be displayed and operated. Such a specific examination that selects and limits the analysis items can be used in the examination mode such as the human dock mode described above, health diagnostic mode, and night mode.

According to the present embodiment, by associating information on not only the measurement type but also on the analysis item with an examination mode, it is possible to display and operate only the information on necessary analysis item among information on the specific measurement type. The analysis item is not limited to the specific measurement type, and can be set across the measurement type, and therefore, it is possible to set an analysis item that is frequently analyzed in combination. For example, when analyzing only the specific analysis item such as a health diagnosis, as long as the analysis item is set, information on other items cannot be operated and displayed, and therefore a risk of operating unnecessary information is reduced. Since the information to be displayed can be selected, the readability of the screen is improved. In addition, since the analysis item that is frequently analyzed in combination can be set, examination work can be made more efficient.

Fifth Embodiment

The fifth embodiment is an embodiment of the automatic analysis device in which the measurement type and the analysis item input from the input device is associated with the setting information in combination with common function of the automatic analysis device and stored in the table 210 of the storage unit, and the display device can display and operate information related to the common function based on the associated information.

In the present embodiment, not only information on a plurality of measurement types can be combined and associated with the examination mode of the setting information to be set, but the common function of the automatic analysis device such as a routine operation or a calibration function can also be set to an enable or disable operation for each measurement type.

FIG. 9 shows a screen example in which the examination mode "biochemistry and immunology measurement" is set with an authority in which operation level 3 is selected for the biochemistry examination item and the immunology examination item, such that all operations including the routine operation, the reagent management, the calibration, accuracy management, and utility operation are enabled, and operation level 1 is selected for the blood clotting examination item such that only the routine operation is enabled.

Reference numeral 902 on an examination mode creation screen 901 is a location in which an examination mode is input as the setting information. Reference numeral 903 denotes an operation setting location that can be performed in each measurement type, that is, an area for setting operation levels 1, 2, and 3. When the setting content on this screen is stored in the storage unit 104, a register button 904 is pressed, and when the examination mode creation screen 901 is closed without storing the settings in the storage unit 104, a cancel button 905 is pressed. As described above, in the present embodiment, operations that can be performed including the common function of the device can be given for each measurement type. A method of dividing the operations that can be performed on the examination mode creation screen 901 is an example and is not limited.

FIG. 10 shows an example of contents of the table stored in the storage unit 104 for the examination mode created on an examination mode creation screen 1001. An upper part of the same figure shows the same contents as the table shown in FIG. 2. A lower part of the same figure shows an example of the table corresponding to detail examination items 1001 of each examination item 212 in the upper part of the table. The operation authority of each detail examination item in the table 210 means that 1 is operable and displayable, and 0 is not operable.

To describe an effect of the embodiment, by setting the operations that can be performed for each measurement type, for the analysis items of a specific measurement type, the setting of the analysis parameters is preferably performed, but for another measurement type, when only the routine operation is preferably performed, by setting the operations that can be performed for each measurement type, only an operation related to a measurement type can be performed. As described above, only the operation related to the measurement type including the common function can be performed, so that the risk of the mistaken operation can be reduced and the convenience of the user can be improved.

Sixth Embodiment

The sixth embodiment is an embodiment of the automatic analysis device in which the information on the measurement type and the analysis item input from the input device is combined and associated with the setting information so as to be stored in the storage unit, the display device displays information related to the associated information and enables operation, and the control unit controls the measurement unit based on the associated information.

In the present embodiment, information on a plurality of measurement types can be combined and associated with an examination mode which is setting information to be set, and an operation of the measurement unit of the device can be restricted in addition to be reflected on the operation screen. That is, contents of the examination mode set in a previous embodiment are applied not only to the operation screen but also to the operation of the automatic analysis device.

In a case of describing the examination mode set in FIG. 3, according to the configuration of the present embodiment, the control unit can control the biochemistry and immunology examination item measurement unit to perform the analysis operation, and prevent the ISE measurement unit 3 and the blood clotting measurement unit 2 from operating.

That is, it is possible to limit the operation of a measurement unit that is not used depending on the setting. For example, even if a user who has no knowledge about a measurement unit uses the device, a mechanism of the measurement unit does not operate by setting, so that safety of the device is improved. A consumption of consumables used in the measurement unit that does not operate can be reduced, and running cost can be reduced.

Seventh Embodiment

The present embodiment shows an embodiment in which the setting of the above embodiments is applied to a multi-module automatic analysis device. Since information on a plurality of types is stored inside the automatic analysis device even in the multi-module automatic analysis device, the same problem as in the composite automatic analysis device occurs for the method of information displaying and operating. Therefore, the above embodiments can be applied.

To describe the effect of the embodiment, even in the multi-module automatic analysis device in which a plurality of measurement units are connected, the same effect as in the above embodiments can be obtained. In the multi-module automatic analysis device, a parameter unique to the measurement unit, such as the reagent, may be displayed separately on the operation screen, but there is also a screen in which information on a plurality of measurement types is displayed in a mixed manner such as the analysis item selection screen. For such a screen, information is selected according to the examination mode, so that in addition to screens that have already been divided, the information can also be divided for the operation screen in which current information is mixed, and convenience of the multi-module automatic analysis device is improved.

The invention is not limited to the embodiments described above and includes various modifications. For example, the above embodiments are described in detail for easy understanding of the invention, and are not necessarily limited to those including all the configurations described above. In the above embodiments, the biochemistry examination item, the immunology examination item, the ISE examination item, and the blood clotting examination item are listed as the measurement types, but the invention is not limited to these measurement types. In the above embodiments, examples of the composite automatic analysis device and the multi-module automatic analysis device with the measurement units of the plurality of measurement types are shown, but a device form is not limited, for example, a module automatic analysis device capable of measuring a single measurement type is also within the application range. Further, in the above embodiments, the analysis item selection screen and the reagent management screen are given as examples, but the application range of the embodiments is the entire screen in which information on the plurality of measurement type is mixed in the automatic analysis device, and is not limited to a specific screen.

A partial configuration of one embodiment can be added to the configuration of another embodiment. In addition, a part of each embodiment may be added, deleted, or replaced with another configuration.

Furthermore, although an example of creating a program of the computer for realizing a part or all of the configurations and functions described above is described, it is needless to say that a part or all of them may be realized by hardware, for example, by designing an integrated circuit. That is, all or a part of the functions of the automatic analysis device may be realized by an integrated circuit such as an application specific integrated circuit (ASIC) or a field programmable gate array (FPGA) instead of the program.

REFERENCE SIGN LIST 1 automatic analysis device
2 blood clotting time analysis unit
3 ISE measurement unit
11 sample disk
12 sample dispensing probe
13 reaction disk
14 second reagent dispensing probe
15 first reagent disk
16 second reagent disk
17 first reagent dispensing probe
18 sample dispensing position
19 photometer
20 blood clotting reagent dispensing probe
21 blood clotting time detection unit
22 optical jig magazine
23 reaction container transfer mechanism
24 reaction container disposal port
25 disposable reaction container magazine
26 reaction container for biochemistry and immunology analysis
27 sample container
28 reaction container for blood clotting analysis
101 interface
102 external output medium
103 display device
104 storage unit
105 computer
106 printer
107 input device
201 sample dispensing control unit
202 transfer mechanism control unit
203 A/D converter (2)
204 blood clotting reagent dispensing control unit
205 A/D converter (1)
206 reagent dispensing control unit (1)
207 reagent dispensing control unit (2)
208 ISE measurement unit control unit
209 reaction port
201 table
211 examination mode
212 examination item
301 examination mode creation screen
302 examination mode input location
303 biochemistry examination item setting column
304 immunology examination item setting column
305 ISE examination item setting column
306 blood clotting examination item setting column
307, 804, 904 register button
308, 405, 805, 905 cancel button
401 examination mode selection screen
402 user ID setting column
403 examination mode setting column
404 application button
501, 601, 701, 806 analysis item selection screen
502 reagent management screen
602 reagent management screen
702 reagent management screen
801 examination mode detail setting screen
802, 902 examination mode setting column
803 analysis item selection location
901 examination mode creation screen
903 operation level setting column
1001 detail examination item

The invention claimed is:

1. An automatic analysis device for analyzing analysis items of a plurality of measurement types, the automatic analysis device comprising:

a sample disk holding a sample container accommodating a sample;

a sample dispensing mechanism configured to dispense the sample from the sample container;

a reagent disk holding a reagent container accommodating a reagent;

a reagent dispensing mechanism configured to dispense the reagent from the reagent container;

a first measurement device including a photodetector and first circuitry for performing measurement for a first measurement type using a first sample dispensed from the sample disk by the sample dispensing mechanism and a first reagent dispensed from the reagent disk by the reagent dispensing mechanism;

a second measurement device including the photodetector and second circuitry, different from the first circuitry, for performing measurement for a second measurement type, different from the first measurement type, and using a second sample dispensed from the sample disk by the sample dispensing mechanism and a second reagent dispensed from the reagent disk by the reagent dispensing mechanism, the second reagent not being used in the first measurement type;

a storage, wherein the storage stores a table including information regarding an operation level applied to each of the measurement types where each operation level indicates which operations are permitted to be performed for each of the measurement types, respectively in combination with information regarding the plurality of measurement types, respectively;

a display having a display screen; and a computer, the computer configured to:

send commands to control operation of the first and second measurement devices and receive input information selecting a measurement type of the plurality of measurement types;

upon receiving the input information selecting the first measurement type, control the display to display information associated with the first measurement type in a manner distinguishable from information associated with measurement types other than the first measurement type, the information associated with the first measurement type being displayed to be operable by an operator while the information associated with measurement types other than the first measurement type, that is different from the information associated with the first measurement type, being displayed to not be operable by the operator;

upon receiving the input selecting the first measurement type, control the display to display information associated with the first reagent in a manner that is selectable and preventing displaying information associated with the second reagent in a manner that is selectable; and retrieve, from the storage, the table which stores the operation level applied to each of the measurement types, and control the display to display the operation level applied for the input selecting the first measurement type.

2. The automatic analysis device according to claim 1, wherein
the computer controls the display to not display the information associated with measurement types other than the selected measurement type.

3. The automatic analysis device according to claim 1, wherein
the computer controls the display to display the information associated with the selected measurement type and the information associated with measurement types other than the selected measurement type by using different colors for each measurement type.

4. The automatic analysis device according to claim 1, wherein
the storage stores the table including information regarding an operation level applied to each of the measurement types and at least one common function of the automatic analysis device based on each operation level, and
the computer controls the display to display information related to the at least one common function to be operable based on the associated information related to the operation level of the selected measurement type.

5. The automatic analysis device according to claim 4, wherein
the computer is programmed to send commands to control operation of the first and second measurement devices based on the associated information related to the operation level of the selected measurement type to allow operation of only corresponding ones of the first and second measurement devices related to the at least one common function.

6. The automatic analysis device according to claim 1, wherein the computer is further configured to:
upon receiving the input information selecting the second measurement type, control the display to display information associated with the second measurement type in a manner distinguishable from information associated with measurement types other than the second measurement type, the information associated with the second measurement type being displayed to be operable by an operator while the information associated with measurement types other than the second measurement type, that is different from the information associated with the second measurement type, being displayed to not be operable by the operator.

7. The automatic analysis device according to claim 6, wherein the first measurement device measures information related to biochemistry and immunology and the second measurement device measures information related to blood clotting.

8. The automatic analysis device according to claim 6, further comprising:
a third measurement device, the third measurement device being an ion selective electrode (ISE) device,
wherein the computer is further configured to:
upon receiving input information selecting the third measurement type, control the display to display information associated with the third measurement type in a manner distinguishable from information associated with measurement types other than the third measurement type, the information associated with the third measurement type being displayed to be operable by an operator while the information associated with measurement types other than the third measurement type, that is different from the information associated with the third measurement type, being displayed to not be operable by the operator.

9. The automatic analysis device according to claim 8, wherein
the display is controlled to not display the information associated with measurement types other than the selected measurement type.

10. The automatic analysis device according to claim 8, wherein
the display is controlled to display the information associated with the selected measurement type and the information associated with measurement types other than the selected measurement type by using different colors for each measurement type.

11. The automatic analysis device according to claim 8, wherein
the storage unit stores the table including information regarding an operation level applied to each of the measurement types and at least one common function of the automatic analysis device based on each operation level, and
the display is controlled to display information related to the at least one common function to be operable based on the associated information related to the operation level of the selected measurement type.

12. The automatic analysis device according to claim 11, wherein
the computer is further configured to control the first, second and third measurement devices based on the associated information related to the operation level of the selected measurement type to allow operation of only corresponding ones of the first, second and third measurement devices related to the at least one common function.

* * * * *